United States Patent Office 3,308,177
Patented Mar. 7, 1967

3,308,177
PRODUCTION OF CYCLODODECENE
Kenneth E. Atkins, South Charleston, W. Va., assignor to Union Carbide Corporation, a corporation of New York
No Drawing. Filed June 28, 1965, Ser. No. 467,735
10 Claims. (Cl. 260—666)

This invention is concerned with a method for producing cyclododecene from 1,5,9 - cyclododecatriene. More particularly, this invention relates to the conversion of 1,5,9-cyclododecatriene to cyclododecene at high reaction rates and in a form such that it may be recovered from the reaction mixture in high purity.

Cyclododecene is a valuable intermediate for a number of potentially valuable commercial products. For example, it can be converted by ozonolysis to 1,12,-dodecanedioic acid, which, in turn, has utility as a monomer for polyamides, i.e., nylons. Cyclododecene can also be converted to laurolactam, another nylon precursor, via (1) an oxo reaction, oxidation of the oxo product (cyclododecylmethanal and hydroxymethylcyclododecane) to cyclododecane carboxylic acid and reaction of the acid with nitrosylsulfuric acid, or (2) reaction of cyclododecene with nitrosyl chloride, hydrogenolysis of the resulting chlorooxime to form cyclododecanone oxime and rearrangement of the oxime to laurolactam.

In addition, cyclododecane carboxylic acid has been reported to be a pesticide (Belgian Patent 631,146) and its esters are known as plasticizers.

Although there are several techniques for converting 1,5,9-cyclododecatriene to cyclododecene, none have been particularly satisfactory. The main difficulty is in obtaining cyclododecene in high purity. Because cyclododecatriene, cyclododecadiene, cyclodecene and cyclodecane all distill within a few degrees, fractionation is not a commercially-acceptable method of purification. High purity cyclododecene is necessary, however, to achieve efficient conversion to other products. For example, ozonization of 97 percent cyclododecene provides an almost quantitative yield of 1,12-dodecanedioic acid, but only an 88 percent refined yield, based on cyclododecene, is obtained from 87 percent pure olefin.

Prior to this invention, cyclododecatriene has been directly hydrogenated at high pressures by the use of nickel sulfide (Belgian Patent 634,763) or dicobalt octacarbonyl as a catalyst. The former process is undesirable because the product contains about 75 percent cyclododecane at commercially-acceptable conversions, and the latter process, when effected batch-wise, produce high purity cyclododecene only under conditions requiring long reaction times, of the order of 10 hours. British Patent 920,754 describes a nickel-catalyzed hydrogenation process employing alcohols as hydrogen-transfer agents. This process is unsatisfactory, however, in that long reaction times (20–30 hours) are required and the alcohol is consumed, being converted to carbonyl compounds which are of little commercial value.

It has been discovered by this invention that 1,5,9-cyclododecatriene, when heated at elevated pressures and temperatures in contact with hydrogen and carbon monoxide and, as a catalyst, dicobalt octacarbonyl or a cobaltous salt, is readily converted to a product from which relatively high purity cyclododecene is readily recovered. This reaction product comprises mainly (1) a hydrocarbon fraction containing high purity (at least 90 percent) cyclododecene plus minor amounts of cyclododecatriene, cyclododecadiene and cyclododecane, and (2) an "oxo fraction" comprising cyclododecylmethanal or diketals thereof and hydroxymethylcyclododecane. The hydrocarbon fraction is readily separated from the oxo fraction by distillation, thereby providing high purity cyclododecene by simple purification techniques. Moreover, the oxo fraction can be converted to valuable intermediates, such as cyclododecane carboxylic acid, or the cyclododecylmethanal can be pyrolyzed over a cobalt-molybdenum catalyst to produce additional cyclododecene.

The recovery of high purity cyclododecene in high yields (at least about 40 percent) from this reaction is clearly unexpected in view of the disclosure in Belgian Patent 627,228 (Chem. Abs. 60 10569c) that the cobalt acetate-catalyzed reaction of cyclododecatriene with hydrogen and carbon monoxide followed by hydrogenation of the reaction product produced hydroxymethyl-cyclododecane in about 90 percent yield. The reasons for the differences in yields are not clearly understood, but applicant's results are believed due to limiting the maximum amount of carbon monoxide which is present in the reaction system. On the other hand, carbon monoxide must be present to provide selective hydrogenation of cyclododecatriene to cyclododecene.

It has been found by this invention that good yields of high purity cyclododecene can be obtained when the cyclododecatriene is contacted with at least about 0.4 mole of carbon monoxide per mole of cyclododecatriene, with an amount of at least about 0.6 mole per mole being preferred. The amount of carbon dioxide should not be permitted to exceed about 2 moles per mole of cyclododecatriene, with amounts of less than about 1.5 moles per mole being preferred.

The amount of hydrogen employed is not highly critical to this invention, but should be at least the stoichiometric amount necessary to convert cyclododecatriene to cyclododecene, i.e., at least about 2 moles of hydrogen per mole of cyclododecatriene, with amounts of at least about 2.5 moles per mole being preferred. The maximum amount of hydrogen is not narrowly critical, and can be as high as 10 moles per mole of cyclododecatriene or even higher. However, at these high amounts the yield of cyclododecane tends to become excessive and, thus, it is preferred that the amount of hydrogen be less than about 7 moles per mole of cyclodecatriene.

By the molar amount of carbon monoxide or hydrogen is meant the entire amount fed to the reaction, whether conducted in one or more steps, and not molar ratio fed to any single stage. For example, one mole of cyclododecatriene can be reacted in a first step with 3.6 moles of hydrogen and 0.23 mole of carbon monoxide and the liquid reaction product thereafter reacted in a second step with an additional 3.4 moles of hydrogen and 0.45 mole of carbon monoxide to provide a reaction in which a total of 7 moles of hydrogen and 0.68 mole of carbon monoxide are charged per mole of cyclododecatriene charged without departing from this invention.

The catalysts which are employed in the process of this invention are dicobalt octacarbonyl ($Co_2(CO)_8$) or cobaltous ($Co^{++}$) salts of organic or inorganic acids, such as cobalt acetate, cobalt octanoate, cobaltous chloride and the like. Cobalt salts of monocarboxylic alkanoic acids of up to 10 carbons are preferred. The cobaltous compound can be charged to the reaction as such or as a complex, for example a dicobalt octacarbonyl-triphenyl phosphine complex, a dicobalt octacarbonyl-pyridine complex or a cobaltous chloride-amide complex. The amount of catalyst is not highly critical to this invention, and can vary from about 1 weight percent or less to about 10 weight percent or more, based on cyclododecatriene fed.

The dicobalt octacarbonyl or cobaltous salt is not believed to be the active catalyst, however, for in batch experiments it has been found that an induction period is necessary before any reaction occurs. Infrared analysis of the catalyst phase before and after initiation of the reaction indicates, by the appearance of absorption bands at 4.89, 4.91 and 5.1 microns, that a species, so far unidentified, must form before initiation of the reaction. Nevertheless, dicobalt octacarbonyl or cobaltous salts will be referred to herein as being the catalysts.

The reaction conditions of temperature and pressure are not highly critical to this invention. For example, the reaction occurs at elevated temperatures, with temperatures of from about 85° C. or below to 285° C. or higher being useful. Temperatures in the range of from about 130° C. to about 200° C. are preferred however.

Similarly, although elevated pressures are required, total pressures in the range of from about 800 p.s.i.g. to over 8000 p.s.i.g. are usually employed. The specific pressure employed will depend upon the desired molar ratio of hydrogen and carbon dioxide, reaction temperature and volume of the reaction system.

Although solvents are not necessary to the process of this invention, their use is desirable. Suitable solvents include hydrocarbons such as hexane, lower alkanols, i.e., monohydric saturated alcohols of up to 6 carbons, such as ethanol or butanol, and pyridine. Acidic solvents, for example, acetic acid, should not be employed. Water can be present in amounts of up to about 25 volume percent of the solvent system, but if present in greater amounts tends to destroy the selectivity of the hydrogenation. Particularly preferred as solvents are the lower alkanols, with ethanol being especially preferred. The amount of solvent is not critical to this invention and the weight ratio of solvent to cyclododecatriene can vary from about 0.3:1 or less to about 50:1 or more, with ratios of from about 0.7:1 to about 5:1 being preferred.

The reaction time is not highly critical to the process of this invention, and can vary from as low as one minute or less to 2 hours or more. At temperatures in the range of 130 to 180° C. the reaction is generally complete in less than one hour, and additional heating is unnecessary. To obtain a hydrocarbon fraction containing at least 90% cyclododecene, it is necessary, however, to carry the reaction to at least 95 and preferably at least 97 percent conversion of cyclododecatriene to more saturated products, including oxo products.

The process of this invention can be conducted by any suitable technique, for example by batch, semi-continuous or continuous processes employing one or more reaction stages. The cyclododecene is recovered from the reaction by suitable techniques, for example by filtration to remove catalyst and distillation of the filtrate. The process of this invention is not limited to this recovery technique, however, and other techniques known to the art can be employed.

EXAMPLE 1

A 3-liter stainless steel rocker autoclave was charged with 600 grams (3.7 moles) of 1,5,9-cyclododecatriene, 24 grams of cobalt acetate tetrahydrate $$(Co(O_2CCH_3)_2 \cdot 4H_2O)$$

600 milliliters of absolute ethanol and 30 milliliters of distilled water. After pressuring with 500 p.s.i. (4.07 moles) of carbon monoxide and 2500 p.s.i. (20.7 moles) of hydrogen, the autoclave was sealed and heated, with rocking, to 106° C. over 1.75 hours, at which time the pressure was 3400 p.s.i.g. An exothermic reaction occurred, with the absorption of gas and a maximum observed temperature of 180° C., over a period of 28 minutes, at the end of which period the temperature was 150° C. and the pressure was 400 p.s.i.g. After cooling to room temperature there was recovered 1181 grams of reaction product which, on distillation yielded 396 grams of a hydrocarbon fraction, 151 grams of an oxo fraction and 114 grams of a polymeric residue. The hydrocarbon fraction contained 96.5 percent cyclododecene, 1.8 percent cyclododecadiene and 1.8 percent cyclododecane, as determined by vapor phase chromatographic analysis. The oxo fraction contained cyclodecylmethanal, and its diethylketal, and hydroxymethylcyclododecane.

EXAMPLE 2

Employing procedures similar to those described in Example 1, a series of experiments were conducted employing a 1-liter stainless steel rocker autoclave. The charges, temperatures of initiation of the exothermic reaction, maximum observed temperature and results of these experiments are summarized in Table I.

TABLE I

| | Run No. | | | | | | | |
|---|---|---|---|---|---|---|---|---|
| | 1 | 2 | 3 | 4a | 4b | 5 | 6 | 7 |
| Charge: | | | | | | | | |
| Cyclododecatriene, gm | 200 | 200 | 200 | 200 | [1] 331 | 200 | 100 | 200 |
| Cobalt acetate, gm | 8 | 8 | 8 | 8 | 8 | 8 | 4 | 8 |
| Ethanol, ml | 200 | 180 | | 200 | 50 | 200 | 100 | 200 |
| Water, ml | | 20 | 200 | | | | | |
| Hydrogen, p.s.i | 1,200 | 3,000 | 3,000 | 1,600 | 1,500 | 3,850 | 600 | 3,000 |
| Carbon monoxide, p.s.i | 500 | 300 | 300 | 100 | 200 | 500 | 250 | |
| Mole ratio H$_2$:CO:C$_{12}$H$_8$ | 2.7:1.1:1 | 6.7:0.67:1 | 6.7:9.67:1 | 3.6:0.23:1 | 3.4:0.45:1 | 8.6:1.1:1 | 2.7:1.1:1 | 6.7:0:1 |
| Reaction: | | | | | | | | |
| Temperature, °C.: | | | | | | | | |
| Initiation | 135 | 139 | 200 | 139 | 130 | 108 | 155 | 215 |
| Maximum | 165 | 180 | | 150 | 166 | 150 | 161 | 250 |
| Time of exotherm, min | 20 | 25 | 0 | 1.5 | 2.5 | 18 | 5 | 0 |
| Product: | | | | | | | | |
| Hydrocarbon fraction, gm | 100 | 108 | | ([2]) | 113 | 82 | 50 | ([3]) |
| Analysis, percent: | | | | | | | | |
| Cyclododecene | 97.2 | 96.0 | 26.5 | | 93.0 | 93.4 | 93.3 | |
| Cyclododecatriene | 1.7 | 1.0 | 29.9 | | 3.4 | | | |
| Cyclododecadiene | 0.8 | 1.2 | 20.4 | | 2.4 | 2.4 | | |
| Cyclododecane | 0.4 | 1.8 | 23.1 | | 1.2 | 4.2 | 6.7 | |
| Oxo fraction gm | 70 | 62 | | | 72 | 101 | | |

[1] Charge was product of Run 4a.
[2] Product contained only 20-30% converted cyclododecatriene.
[3] Cyclododecane was the predominant hydrocarbon product.

As can be seen by a comparison of Runs 1 and 6, the total pressure of the reaction system has very little effect on the yield or purity of cyclododecene, all other variables being equal. Runs 1–3, when compared, show that the presence of water in small amounts (Run 2) has little effect on the reaction, but that no selectivity in hydrogenation is obtained when the reaction medium is all water. Runs 4 and 7 illustrate the importance of contacting cyclododecatriene with sufficient carbon monoxide, for the conversion was low at a carbon monoxide/cyclododecatriene ratio of 0.23:1, but was high when the total amount of carbon monoxide charged was 0.68 mole per mole of cyclododecatriene charged. In the absence of carbon monoxide (Run 7), little cyclododecene was produced. Run 5 shows that a high hydrogen/cyclododecatriene ratio, although not greatly affecting the purity of cyclododecene, does increase the amount of cyclododecane formed.

EXAMPLE 3

Employing apparatus and procedures similar to those employed in Example 1, the autoclave was charged with 200 grams of cyclododecatriene, 8 grams of cobalt octanoate, 2600 p.s.i. of hydrogen and 400 p.s.i. of carbon monoxide. There was recovered 46 grams of a hydrocarbon fraction containing 92 percent cyclododecene, 0.5 percent cyclododecadiene and 7.5 percent cyclododecane. This experiment, when compared with, for example Run 2 of Example 2, illustrates that the formation of cyclododecane is suppressed by the use of an alcoholic reaction medium.

EXAMPLE 4

Employing apparatus and procedures similar to those described in Example 2, the autoclave was charged with 200 grams of cyclododecatriene, 8 grams of a dicobalt octacarbonyltriphenylphosphine complex, 200 milliliters of absolute ethanol, 2500 p.s.i. of hydrogen and 500 p.s.i. of carbon monoxide. The product hydrocarbon fraction weighed 130 grams and contained 92 percent cyclododecene, 1.3 percent cyclododecatriene, 2.9 percent cyclododecadiene and 3.8 percent cyclododecane. When this experiment was repeated, except that 3000 p.s.i. of hydrogen, and no carbon monoxide was charged, and the catalyst was dicobalt octacarbonyl, no reaction was observed even on heating to over 200° C. Thus, when an alcoholic medium is employed for a dicobalt octacarbonyl-catalyzed process, carbon monoxide must be present for the reaction to occur.

What is claimed is:

1. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone, (2) charging to said reaction zone a cobalt compound selected from the group consisting of dicobalt octacarbonyl and a cobaltous salt in an amount sufficient to catalyze said reaction, (3) conducting said reaction for a period of time sufficient to convert at least 95 percent of said cyclododecatriene to more saturated products, and (4) thereafter recovering said cyclododecene.

2. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone, (2) charging to said reaction zone dicobalt octacarbonyl in an amount sufficient to catalyze said reaction, (3) conducting said reaction for a period of time sufficient to convert at least 95 percent of said cyclododecatriene to more saturated products, and (4) thereafter recovering said cyclododecene.

3. In a process for producing cyclododecene by the reaction of 1,5,9-cyclododecatriene with hydrogen in a reaction zone at elevated temperature and pressure, the improvement of (1) effecting said reaction in the presence of from about 0.4 to 2 moles of carbon monoxide per mole of cyclododecatriene charged to said reaction zone, (2) charging to said reaction zone a cobaltous salt in an amount sufficient to catalyze said reaction, (3) conducting said reaction for a period of time sufficient to convert at least 95 percent of said cyclododecatriene to more saturated products, and (4) thereafter recovering said cyclododecene.

4. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclodocecatriene charged to said reaction zone, (2) charging to said reaction zone a cobaltous salt of a monocarboxylic acid of up to 10 carbons in an amount sufficient to catalyze said reaction, (3) conducting said reaction for a period of time sufficient to convert at least 95 percent of said cyclododecatriene to more saturated products, and (4) thereafter recovering said cyclododecene.

5. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone, (2) charging to said reaction zone cobaltous acetate in an amount sufficient to catalyze said reaction, (3) conducting said reaction for a period of time sufficient to convert at least 95 percent of said cyclododecatriene to more saturated products, and (4) thereafter recovering said cyclododecene.

6. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone and, as a reaction medium, a lower monohydric alkanol containing water in an amount of from 0 to about 25 volume percent of said reaction medium, (2) charging to said reaction zone a cobalt compound selected from the group consisting of dicobalt octacarbonyl and a cobaltous salt in an amount sufficient to catalyze said reaction, (3) conducting said reaction for a period of time sufficient to convert at least 95 percent of said cyclododecatriene to more saturated products, and (4) thereafter recovering said cyclododecene.

7. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone and, as a reaction medium, ethanol containing water in an amount of from 0 to about 25 volume percent of said reaction medium, (2) charging to said reaction zone a cobalt compound selected from the group consisting of dicobalt octacarbonyl and a cobaltous salt in an amount sufficient to catalyze said reaction, (3) conducting said reaction for a period of time sufficient to convert at least 95 percent of said cyclododecatriene to more saturated products, and (4) thereafter recovering said cyclododecene.

8. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone and, as a reaction medium, ethanol containing water in an amount of from 0 to about 25 volume percent of said reaction medium, (2) charging to said reaction zone dicobalt octacarbonyl in an amount sufficient to catalyze said reaction, (3) conducting said reaction for a period of time sufficient to convert at least 95 percent of said cyclododecatriene to more saturated products, and (4) thereafter recovering said cyclododecene.

9. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone and, as a reaction medium, ethanol containing water in an amount of from 0 to about 25 volume percent of said reaction medium, (2) charging to said reaction a cobaltous salt of a monocarboxylic acid of up to 10 carbons in an amount sufficient to catalyze said reaction, (3) conducting said reaction for a period of time sufficient to convert at least 95 percent of said cyclododecatriene to more saturated products, and (4) thereafter recovering said cyclododecene.

10. In a process for producing cyclododecene by the reaction of 1,5,9-cyclododecatriene with hydrogen in a reaction zone at elevated temperature and pressure, the improvement of (1) effecting said reaction in the presence of from about 0.4 to about 2 moles of carbon monoxide per mole of cyclododecatriene charged to said reaction zone and, as reaction medium, ethanol containing water in an amount of from 0 to about 25 volume percent of said reaction medium (2) charging to said reaction zone cobaltous acetate in an amount sufficient to catalyze said reaction, (3) conducting said reaction for a period of time sufficient to convert at least 95 percent of said cyclododecatriene to more saturated products, and (4) thereafter recovering said cyclododecene.

References Cited by the Examiner

Thomas Rull: Societe Chimique de France, Bulletin, Ser. 5, pp. 2680–2683, October 1964.

DELBERT E. GANTZ, *Primary Examiner.*

V. O'KEEFE, *Examiner.*